April 14, 1959     C. C. BAUERLEIN     2,881,800
ADJUSTABLE VENTURI PROPORTIONING VALVE
Filed Aug. 13, 1956
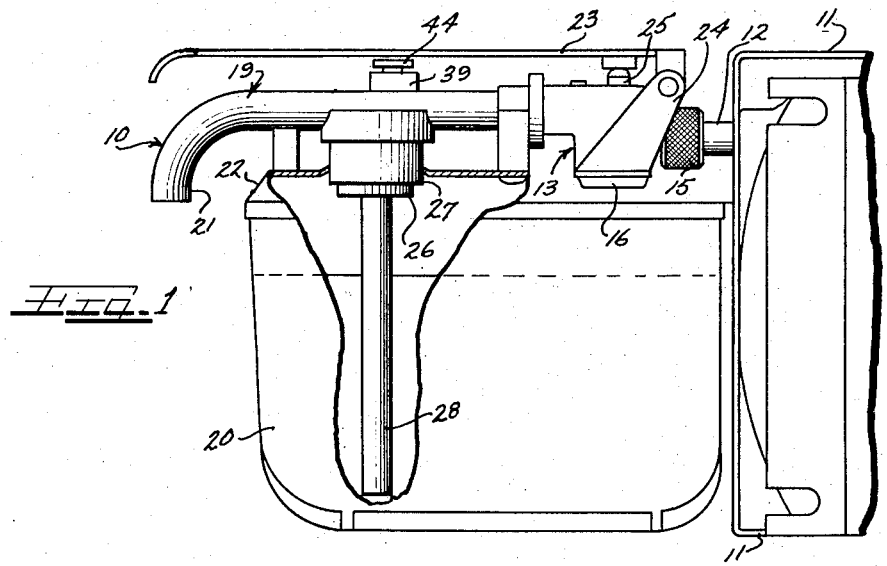
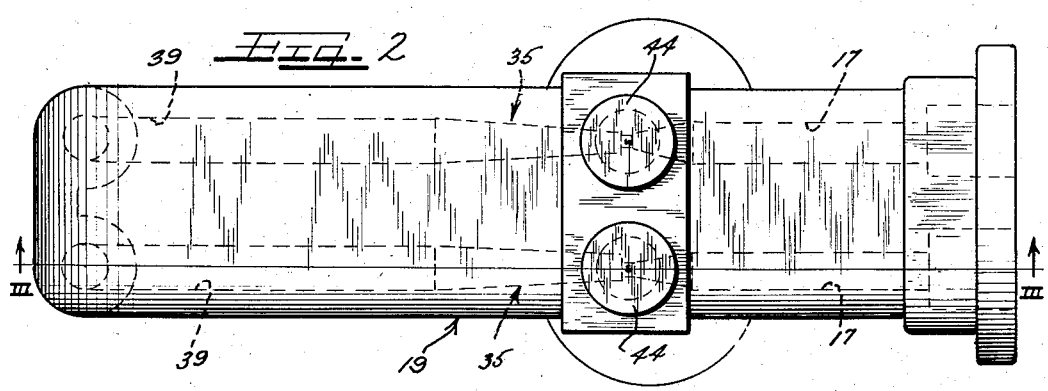
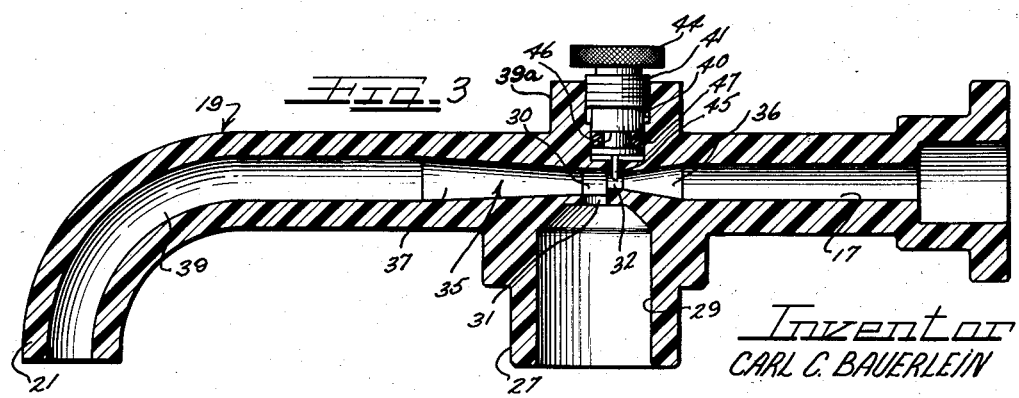
Inventor
CARL C. BAUERLEIN United States Patent Office 2,881,800
Patented Apr. 14, 1959

2,881,800

ADJUSTABLE VENTURI PROPORTIONING VALVE

Carl C. Bauerlein, Lincolnwood, Ill., assignor to The Dole Valve Company, Chicago, Ill., a corporation of Illinois Application August 13, 1956, Serial No. 603,680

5 Claims. (Cl. 137—604)

This invention relates to improvements in dispensing and proportioning devices for concentrates and the like.

A principal object of the invention is to provide a proportioning dispenser operating on the Venturi principle in which the proportion of the mix of the concentrate and diluting fluid may be selected.

Another object of the invention is to provide a simple and improved form of proportioning and dispensing device in which a Venturi serves as a proportioning device and in which the rate of flow and proportion of the mix may be selected by adjustably moving a throttling needle within the throat of the Venturi.

These and other objects of the invention will appear from time to time as the following specification proceeds and with reference to the acocmpanying drawings wherein:

Figure 1 is a view in side elevation of a concentrate dispenser having a selective proportioning device constructed in accordance with the invention embodied therein with certain parts broken away and certain other parts shown in section;

Figure 2 is a top plan view of the proportioning and dispensing device shown in Figure 1; and Figure 3 is a sectional view taken substantially along line III—III of Figure 2.

In the embodiment of the invention illustrated in the drawings, I have shown a dispensing and proportioning device 10, which is shown for illustrative purposes as being a type which may be contained within a refrigerator (not shown) such as is shown and described in my prior application Serial No. 480,332, filed January 7, 1955, now Patent Number 2,823,833 and entitled, "Concentrate Dispenser."

The proportioning and dispensing device 10 may include a cooling tank 11 for the proportioning water, which may be connected directly with a water supply line. A pipe 12 leads from the cooling tank 11 and is connected with an intake of a valve blank 13 through a coupling 15. The valve bank 13 includes a plurality of independently operable valves 16, each of which is associated with individual passageways 17 in a proportioning body 19, for proportioning and dispensing selected concentrates from a partitioned concentrate container 20 through a downwardly turned spout 21 of the proportioning body. The proportioning body 19 may be mounted on a top 22 for the container 20 and may extend along said container and top, beyond the end thereof, as in the aforementioned application Serial No. 480,332.

Each valve 16 in the valve bank 13 is associated with a passageway 17 in the proportioning and dispensing body 19 and is operated by a hand lever 23 pivoted between supoprt brackets 24 extending upwardly and angularly rearwardly from the bottom of the valve bank 13. The hand lever 23 extends over and has engagement with a depressible plunger 25, for depressing said plunger upon the pressing down on said hand lever 23, to admit diluting water under pressure to the passageway 17.

Concentrate is supplied to the proportioning and dispensing device through a suction tube 28 leading to a position adjacent the bottom of the partitioned container 20 on one side of the partition thereof and connected with a fitting 26 at its upper end fitting within and sealed to a downwardly opening hollow boss 27, the hollow interior portion of which forms a concentrate chamber 29 having communication with a vacuum chamber 30 through a reduced area passageway 31. The vacuum chamber 30 is shown as being on the downstream side of a throat 32 of a Venturi 35. A check valve (not shown) may be provided in the concentrate chamber 29 as in my aforementioned application Serial No. 480,332 and no part of the present invention so not herein shown or described.

The passageway 17 is in communication with the outlet from a valve 16 of the bank of valves 13 and terminates into the base of a frusto-conical passageway 36, forming the upstream side of the Venturi 35. The apex of the passageway 36 leads into the reduced diameter throat 32, which terminates into the vacuum chamber 30. The vacuum chamber 30 in turn communicates with an inverted cone-like passageway 37, leading into a passageway 39 extending along a downwardly turned discharge end portion of the spout 21 for discharging proportioned concentrate therefrom.

It will be noted from Figure 3 that the cross-sectional area of the throat 32 of the Venturi 35 is less than the cross-sectional area of the passageway 31 leading to the vacuum chamber 30, and that the cross-sectional area of the base of the truncated cone-like passageway 37 is substantially greater than the cross-sectional area of the vacuum chamber 30 to provide ample capacity to draw a concentrate through the suction tube 28 upon opening of the valve 16 and to avoid choking of the Venturi at the throat thereof.

Referring now to the means for varying the proportion of the mix of concentrate and diluting fluid, a boss 39a extends from the proportioning and dispensing body 19 in an opposite direction from the boss 27 and has a threaded chamber 40 having an adjustment screw 41 threaded therein and having a knurled knob 44 on the outer end thereof, for turning said adjustment screw within said boss and varying the position of a needle 45 with respect to the throat 32 of the Venturi 35.

The adjustment screw 41 is shown as having a groove 46 formed therein adjacent the inner end thereof and having an O-ring 47 contained therein and sealing the threaded chamber 40. The needle 45 in turn extends inwardly from the center of the inner end portion of the adjustment screw 41 into the throat 32 of the Venturi 35 in a radial direction with respect to the center of said throat.

Thus, turning movement of the adjustment screw 41 will vary the depth of penetration of the needle 45 within the throat 32 of the Venturi with a resultant variation in the cross-sectional area of said throat and the flow rate of diluting fluid through the Venturi with resultant variations in the proportion of the mixture of concentrate and water, to attain the desired proportion of the resultant mixture.

It will be understood that modifications and variations of the present invention may be effected without departing from the spirit and scope of the novel concepts thereof.

I claim as my invention:

1. In a device for controllably proportioning a liquid of relatively heavy viscosity with a liquid of relatively light viscosity and dispensing the proportioned liquids as a liquid mixture, a body member, said body member being provided with a fist inlet passageway in said body converging in downstream direction and having a restricted throat, said body member provided with an outlet passageway extending in the same direction as said first inlet passageway and joining said throat, said outlet passageway having a larger cross sectional area at said junction than the cross sectional area of said throat, and said body member having a second inlet passageway communicating with said portion of said outlet passageway of larger cross sectional area than said throat adjacent the junction of said outlet passageway with said throat, and means connected to said throat for controllably varying the cross sectional area of said throat to vary the proportion of said liquids that are mixed and discharged through said outlet passageway and whereby the liquid entering through said second inlet will not enter said throat.

2. A device in accordance with claim 1 wherein said throat varying means comprises a needle projecting into said throat and an adjustment screw means for varying the amount of the needle projects into the throat.

3. In a device for controllably proportioning a liquid of relatively heavy viscosity with a liquid of relatively light viscosity and dispensing the proportioned liquids as a liquid mixture, means defining a first flow passageway for a liquid, means defining a second flow passageway for a liquid to be in series flow arrangement with said first passageway, means defining a venturi throat connected in series flow with one of said passageways and being of smaller cross sectional areas than said passageways, means defining a vacuum chamber positioned between said throat and said other passageway and connected in series flow relationship therewith, an inlet passageway connected to lead into said vacuum chamber whereby liquid flowing into said inlet passageway and liquid flowing through said flow passageways will mix in said vacuum chamber, and means connected to said throat for controllably varying the cross-sectional area of the throat whereby the proportion of liquids mixed may be varied.

4. In a device for controllably proportioning a liquid of relatively heavy viscosity with a liquid of relatively light viscosity and dispensing the proportioned liquids as a liquid mixture, means defining a first inlet passageway converging in a downstream direction, means defining a throat of smaller cross-sectional area than said inlet passageway, means defining a vacuum chamber of smaller cross-sectional area than said inlet passageway, said throat and said vacuum chamber aligned in series flow receiving relationship to receive flow from said inlet passageway, means defining an outlet passageway extending in the same direction as said inlet passageway and receiving flow from said throat and said vacuum chamber, means defining a second inlet passageway in said body member communicating with said vacuum chamber, and means connected to said throat for controllably varying the cross-sectional area of said throat to vary the proportion of said liquids that are mixed and discharged through said outlet passageway and whereby the liquid entering through said second inlet will not join in said throat with liquid entering from said inlet.

5. In a device for controllably proportioning a liquid of relatively heavy viscosity with a liquid of relatively light viscosity and dispensing the proportioned liquids as a liquid mixture, a body member, said body member being provided with a first inlet passageway in said body converging in a downstream direction and having a restricted throat, said body member provided with an outlet passageway extending in the same direction as said first inlet passageway and joining said throat, a vacuum chamber of smaller cross sectional area than said outlet passageway and of larger cross sectional area than said throat, said vacuum chamber located to receive flow from the throat and to discharge to said outlet passageway, a second inlet passageway in said body member communicating with said vacuum chamber, and means connected to said throat for controllably varying the cross sectional area of said throat to vary the proportion of said liquids that are mixed and discharged through said outlet passageway and whereby the liquid entering through said second inlet will not enter said throat.

References Cited in the file of this patent
UNITED STATES PATENTS

| | | |
|---|---|---|
| 210,954 | Minich | Dec. 17, 1878 |
| 718,683 | Wiedenmayer | Jan. 20, 1903 |
| 766,165 | Britten | Aug. 2, 1904 |
| 2,683,622 | Dragon | July 13, 1954 |